(12) United States Patent
Iwatsuki

(10) Patent No.: US 10,793,122 B2
(45) Date of Patent: Oct. 6, 2020

(54) CONTROLLER OF BRAKE SYSTEM FOR MOTORCYCLE, BRAKE SYSTEM FOR MOTORCYCLE, AND CONTROL METHOD OF BRAKE SYSTEM FOR MOTORCYCLE

(71) Applicant: Robert Bosch GmbH, Stuttgart (DE)

(72) Inventor: Junya Iwatsuki, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 16/074,047

(22) PCT Filed: Dec. 12, 2016

(86) PCT No.: PCT/IB2016/057540
§ 371 (c)(1),
(2) Date: Jul. 30, 2018

(87) PCT Pub. No.: WO2017/130042
PCT Pub. Date: Aug. 3, 2017

(65) Prior Publication Data
US 2019/0039581 A1    Feb. 7, 2019

(30) Foreign Application Priority Data

Jan. 28, 2016 (JP) .................................. 2016-014014

(51) Int. Cl.
*B62L 3/02* (2006.01)
*B62L 3/04* (2006.01)
(Continued)

(52) U.S. Cl.
CPC ............ *B60T 8/1706* (2013.01); *B60T 7/122* (2013.01); *B60T 8/171* (2013.01); *B60T 8/58* (2013.01);
(Continued)

(58) Field of Classification Search
CPC .......... B60T 8/1706; B60T 8/58; B60T 8/171; B60T 7/122; B60T 2240/00; B60T 2210/20; B60T 2201/06; B62L 3/04; B62L 3/023
See application file for complete search history.

(56) References Cited

U.S. PATENT DOCUMENTS

2010/0017085 A1* 1/2010 Woywod ................. B60T 7/122
                                                    701/70
2017/0305432 A1* 10/2017 Nemoto .................... B60T 7/12

FOREIGN PATENT DOCUMENTS

| CN | 1477015 A  | 2/2004 |
| CN | 1206127 C  | 6/2005 |

(Continued)

OTHER PUBLICATIONS

International Search Report for Application No. PCT/IB2016/057540 dated Mar. 1, 2017 (English Translation, 3 pages).

*Primary Examiner* — Anne Marie Antonucci
(74) *Attorney, Agent, or Firm* — Michael Best & Friedrich LLP

(57) ABSTRACT

A controller and a control method of a brake system for a motorcycle are obtained, the controller and the control method capable of improving behavior stability of a motorcycle at a time when a road surface is a steep upward slope. The invention also obtains a brake system for a motorcycle that includes such a controller.

In the controller and the control method of the brake system for a motorcycle and in the brake system for a motorcycle according to the invention, in the cases where it is determined that a user's operation of a first brake operation section 11 is present and it is determined that the motorcycle 100 is in a slip-down state where the motorcycle travels backward while a front wheel 3 is braked when the road surface is the upward slope, an emergency braking action (Continued)

that causes a rear-wheel brake mechanism 14 to generate a braking force that brakes a rear wheel 4 is executed.

14 Claims, 6 Drawing Sheets

(51) Int. Cl.
*B60T 7/12* (2006.01)
*B60T 8/171* (2006.01)
*B60T 8/58* (2006.01)
*B60T 8/17* (2006.01)

(52) U.S. Cl.
CPC ............... *B62L 3/023* (2013.01); *B62L 3/04* (2013.01); *B60T 2201/06* (2013.01); *B60T 2210/20* (2013.01); *B60T 2240/00* (2013.01)

(56) References Cited

FOREIGN PATENT DOCUMENTS

| | | |
|---|---|---|
| CN | 1833930 A | 9/2006 |
| CN | 1891546 A | 1/2007 |
| CN | 103786826 A | 5/2014 |
| DE | 102008026531 | 2/2009 |
| DE | 102012223101 | 6/2014 |
| EP | 2090482 | 8/2009 |
| JP | 2011230667 | 11/2011 |
| WO | 2007144337 | 12/2007 |

* cited by examiner

CONTROLLER OF BRAKE SYSTEM FOR MOTORCYCLE, BRAKE SYSTEM FOR MOTORCYCLE, AND CONTROL METHOD OF BRAKE SYSTEM FOR MOTORCYCLE

BACKGROUND OF THE INVENTION

The present invention relates to a controller and a control method of a brake system for a motorcycle and to a brake system for a motorcycle that includes such a controller, the controller and the control method capable of improving behavior stability of a motorcycle at a time when a road surface is a steep upward slope.

As a conventional brake system for a motorcycle, a brake system includes: a first brake operation section that is provided on a handlebar of a motorcycle; a front-wheel brake mechanism that brakes a front wheel of the motorcycle in an interlocking manner with at least the first brake operation section; a second brake operation section that is provided on a trunk of the motorcycle; a rear-wheel brake mechanism that brakes a rear wheel of the motorcycle in an interlocking manner with at least the second brake operation section; and a controller that includes a brake action control section governing an action of at least one of the front-wheel brake mechanism and the rear-wheel brake mechanism.

For example, the brake action control section executes a travel control action during a travel of the motorcycle. In the travel control action, a braking force that is generated by at least one of the front-wheel brake mechanism and the rear-wheel brake mechanism is changed in accordance with a travel state of the motorcycle. For example, the brake action control section permits execution of a hill-hold action when the motorcycle is stopped on an inclined road surface. In the hill-hold action, at least one of the front-wheel brake mechanism and the rear-wheel brake mechanism retains the braking force that suppresses a start of the motorcycle (for example, see JP-A-2011-230667).

SUMMARY OF THE INVENTION

In the conventional brake system for a motorcycle, there is a case where it is difficult to suppress the motorcycle from traveling backward only by a user's operation of the first brake operation section when a vehicle body speed of the motorcycle becomes zero on the steep uphill road surface. In particular, because the second brake operation section is provided on the trunk of the motorcycle, it is difficult for the user to operate the second brake operation section while lowering legs to suppress falling of the motorcycle. Thus, it is even further difficult to suppress the motorcycle from traveling backward.

For example, in the cases where the brake action control section executes the travel control action and, in order to improve stability of the braking force control, the execution of the travel control action is only limited to a case where the vehicle body speed of the motorcycle exceeds a reference speed, the travel control action cannot be executed at timing at which the motorcycle starts traveling backward. Thus, it is difficult to suppress the motorcycle from traveling backward.

For example, in the cases where the brake action control section permits execution of the hill-hold action, and, in order to improve safety of the user, the execution of the hill-hold control is only limited to be permitted only in a case where the motorcycle is stopped for more than a reference time, the execution of the hill-hold action is not permitted at the timing at which the motorcycle starts traveling backward. Thus, it is difficult to suppress the motorcycle from traveling backward by the hill-hold action.

That is, the conventional brake system for a motorcycle has such a problem that behavior stability of the motorcycle is possibly degraded at the time when the road surface is the steep upward slope.

The invention has been made with the above-described problem as the background and therefore obtains a controller and a control method of a brake system for a motorcycle, the controller and the control method capable of improving behavior stability of a motorcycle at a time when a road surface is a steep upward slope. The invention also obtains a brake system for a motorcycle that includes such a controller.

In a controller of a brake system for a motorcycle according to the invention, the brake system for a motorcycle includes: a first brake operation section that is provided on a handlebar of a motorcycle; a front-wheel brake mechanism that brakes a front wheel of the motorcycle in an interlocking manner with at least the first brake operation section; a second brake operation section that is provided on a trunk of the motorcycle; and a rear-wheel brake mechanism that brakes a rear wheel of the motorcycle in an interlocking manner with at least the second brake operation section. The controller includes a brake action control section that at least governs an action of the rear-wheel brake mechanism. The controller further includes: a brake operation determination section that determines presence or absence of a user's operation of the first brake operation section; and a slip-down determination section that determines whether the motorcycle is in a slip-down state where the motorcycle travels backward while the front wheel is braked. In the cases where the brake operation determination section determines that the user's operation of the first brake operation section is present and the slip-down determination section determines that the motorcycle is in the slip-down state when a road surface is an upward slope, the brake action control section executes an emergency braking action that causes the rear-wheel brake mechanism to generate a braking force that brakes the rear wheel.

A brake system for a motorcycle according to the invention includes an above-described controller.

In a control method of a brake system for a motorcycle according to the invention, the brake system for a motorcycle includes: a first brake operation section that is provided on a handlebar of a motorcycle; a front-wheel brake mechanism that brakes a front wheel of the motorcycle in an interlocking manner with at least the first brake operation section; a second brake operation section that is provided on a trunk of the motorcycle; and a rear-wheel brake mechanism that brakes a rear wheel of the motorcycle in an interlocking manner with at least the second brake operation section. The control method includes a brake action control step of at least governing an action of the rear-wheel brake mechanism. The control method further includes: a brake operation determination step of determining presence or absence of a user's operation of the first brake operation section; and a slip-down determination step of determining whether the motorcycle is in a slip-down state where the motorcycle travels backward while the front wheel is braked. In the brake action control step, in the cases where it is determined in the brake operation determination step that the user's operation of the first brake operation section is present and it is determined in the slip-down determination step that the motorcycle is in the slip-down state when a road surface is an upward slope, an emergency braking action that causes the rear-wheel brake mechanism to generate a braking force that brakes the rear wheel is executed.

In the controller and the control method of the brake system for a motorcycle and in the brake system for a motorcycle according to the invention, in the cases where it is determined that the user's operation of the first brake operation section is present and it is determined that the motorcycle is in the slip-down state where the motorcycle travels backward while the front wheel is braked when the road surface is the upward slope, the emergency braking action that causes the rear-wheel brake mechanism to generate the braking force that brakes the rear wheel is executed. Accordingly, even in the case where the motorcycle travels backward regardless of a fact that the front wheel is braked by the user's operation of the first brake operation section when the road surface is the steep upward slope, behavior of a vehicle body can be stabilized without depending on a user's operation of the second brake operation section. Thus, behavior stability of the motorcycle at a time when the road surface is the steep upward slope is improved.

In addition, for example, even in the case where the brake action control section executes a travel control action only when a vehicle body speed of the motorcycle exceeds a reference speed, the rear-wheel brake mechanism generates the braking force that brakes the rear wheel in a state where the vehicle body speed of the motorcycle does not exceed the reference speed, and the behavior stability of the vehicle body can thereby be secured. Thus, realization of the improved stability of the braking force control can be improved by adopting the travel control action that is executed only when the vehicle body speed of the motorcycle exceeds the reference speed.

Furthermore, for example, even in the case where the brake action control section permits execution of a hill-hold action only when the motorcycle is stopped for more than a reference time, the rear-wheel brake mechanism generates the braking force that brakes the rear wheel in a state where the motorcycle is not stopped for more than the reference time, and the behavior stability of the vehicle body can thereby be secured. Thus, realization of improved user safety can be improved by adopting the hill-hold action whose execution is permitted only when the motorcycle is stopped for more than the reference time.

DETAILED DESCRIPTION

A description will hereinafter be made on a controller and a control method of a brake system for a motorcycle and on a brake system for a motorcycle according to the invention by using the drawings.

Note that a description will hereinafter be made on a case where a motorcycle is an automatic two-wheeled vehicle; however, the motorcycle may be another motorcycle such as an automatic three-wheeled vehicle. In addition, a description will hereinafter be made on a case where each of a front-wheel brake mechanism and a rear-wheel brake mechanism is provided in one unit; however, at least one of the front-wheel brake mechanism and the rear-wheel brake mechanism may be provided in multiple units.

Each of a configuration, an action, and the like, which will be described below, is merely one example, and the controller and the control method of the brake system for a motorcycle as well as the brake system for a motorcycle according to the invention are not limited to a case with such a configuration, such an action, and the like.

In addition, the same or similar members or portions will be denoted by the same reference sign in each of the drawings. Furthermore, a detailed structure will be depicted in an appropriately simplified manner or will not be depicted.

A description will hereinafter be made on a brake system for a motorcycle according to a first embodiment.

A description will be made on a configuration of the brake system for a motorcycle according to the first embodiment.

Figure 1:
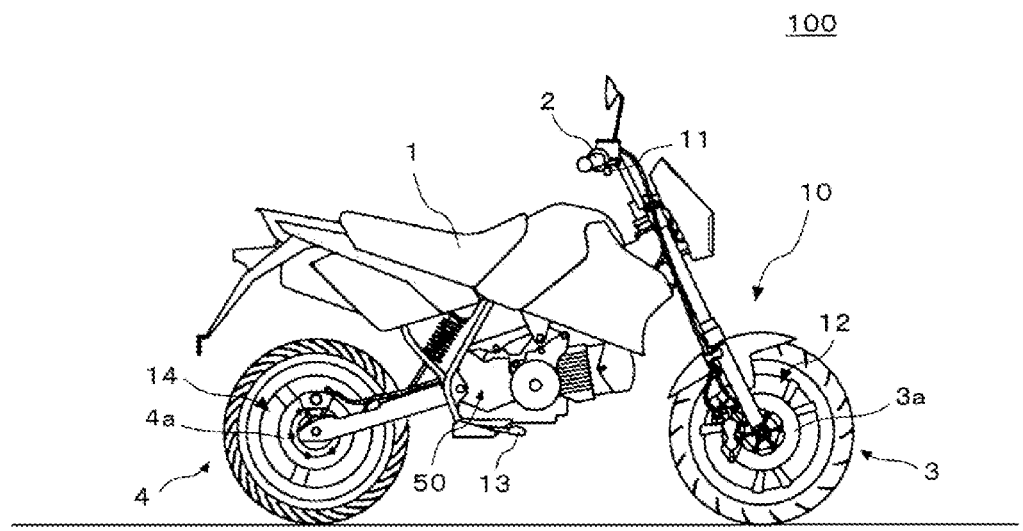
FIG. 1 is a view of a configuration of a motorcycle on which a brake system for a motorcycle according to a first embodiment of the invention is mounted.
Figure 2:
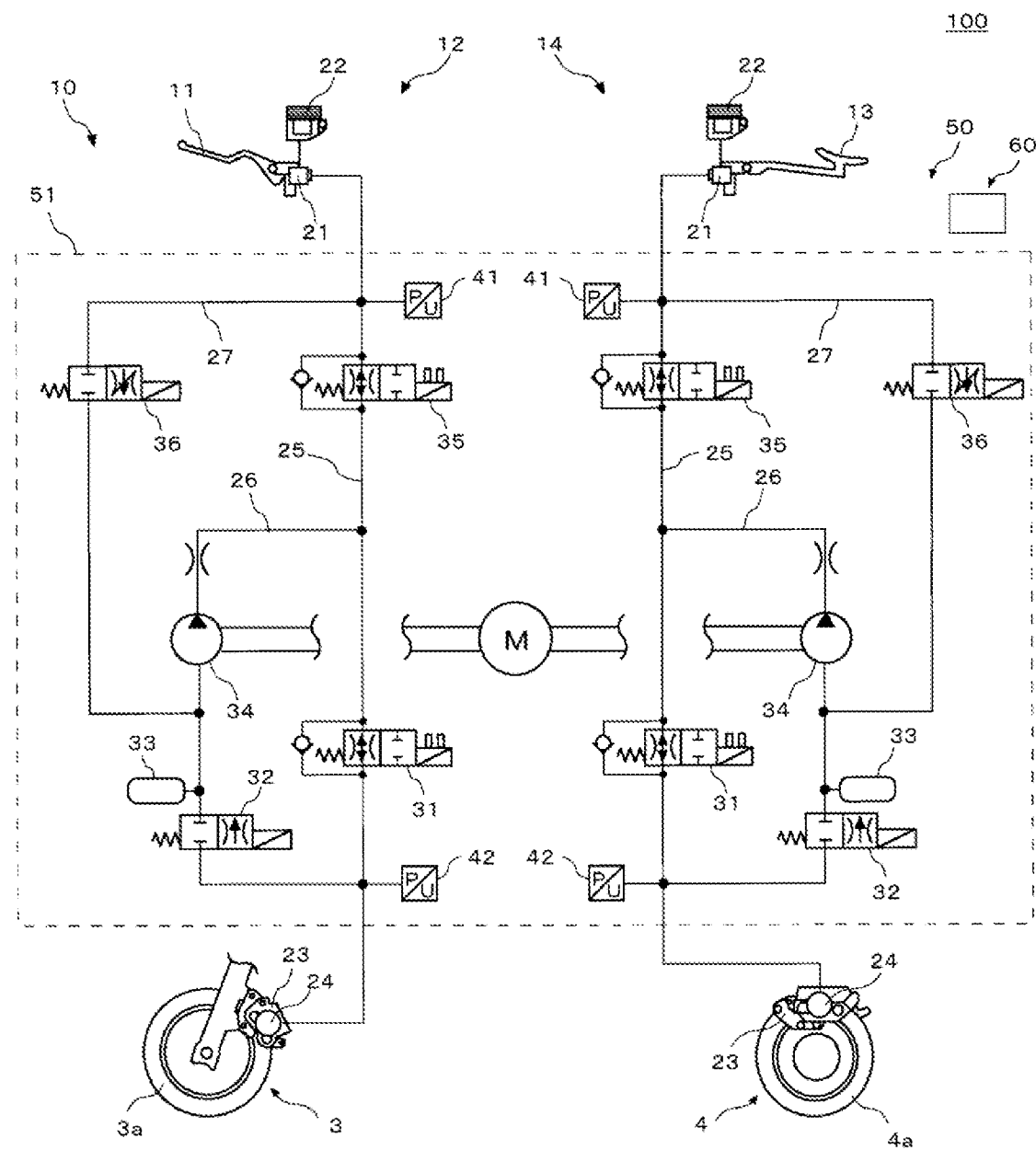
FIG. 2 is a view of a configuration of the brake system for a motorcycle according to the first embodiment of the invention.
Figure 3:
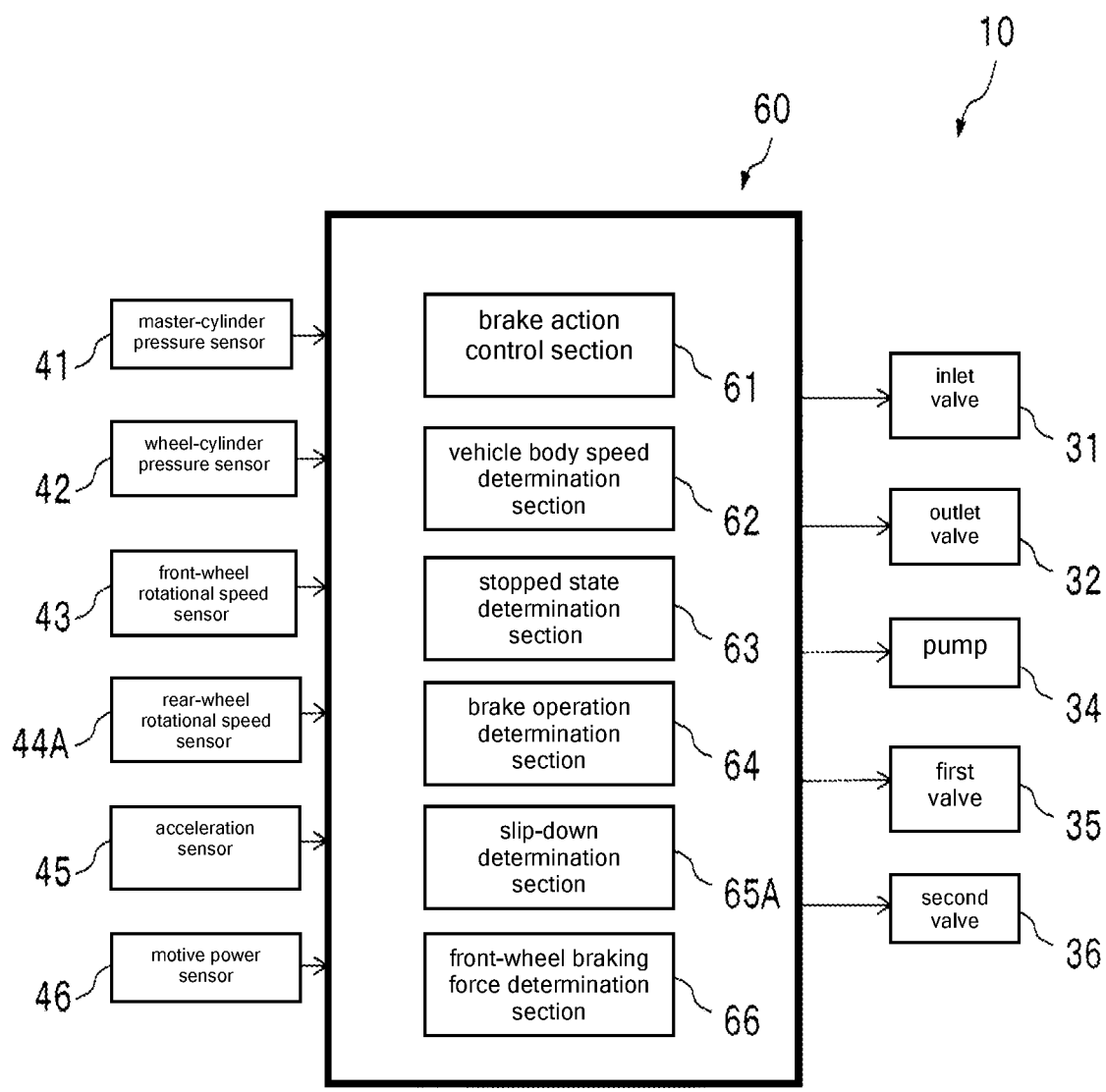
FIG. 3 is a view of a system configuration of a main section of the brake system for a motorcycle according to the first embodiment of the invention.

FIG. 1 is a view of a configuration of a motorcycle on which the brake system for a motorcycle according to the first embodiment of the invention is mounted. FIG. 2 is a view of a configuration of the brake system for a motorcycle according to the first embodiment of the invention. FIG. 3 is a view of a system configuration of a main section of the brake system for a motorcycle according to the first embodiment of the invention.

As depicted in FIG. 1 and FIG. 2, a brake system 10 for a motorcycle is mounted on a motorcycle 100. The motorcycle 100 includes: a trunk 1; a handlebar 2 that is held by the trunk 1 in a freely turnable manner; a front wheel 3 that is held with the handlebar 2 by the trunk 1 in a freely turnable manner; and a rear wheel 4 that is held by the trunk 1 in a freely rotatable manner.

The brake system 10 for a motorcycle includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13.

The first brake operation section 11 is provided on the handlebar 2 and operated by a user's hand. The first brake operation section 11 is a brake lever, for example. The second brake operation section 13 is provided in a lower portion of the trunk 1 and operated by a user's foot. The second brake operation section 13 is a brake pedal, for example.

Each of the front-wheel brake mechanism 12 and the rear-wheel brake mechanism 14 includes: a master cylinder 21 that includes a piston (not depicted); a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which a brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. A first valve (USV) 35 is provided in a portion of the primary channel 25 between an end thereof on the master cylinder 21 side and a position to which a downstream end of the secondary channel 26 is connected. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and is closed in an energized state, for example. The outlet valve 32 is an electromagnetic valve that is closed in the unenergized state and is opened in the energized state, for example. The first valve 35 is an electromagnetic valve that is opened in the unenergized state and is closed in the energized state, for example. The second valve 36 is an electromagnetic valve that is closed in the unenergized state and is opened in the energized state, for example.

A hydraulic pressure control unit 50 is configured by including: members such as the inlet valve 31, the outlet valve 32, the accumulator 33, the pump 34, the first valve 35, and the second valve 36; a base body 51 that is provided with those members and is formed with channels that constitute the primary channel 25, the secondary channel 26, and the supply channel 27 therein; and a controller (ECU) 60. The hydraulic pressure control unit 50 is a unit that has a function of controlling hydraulic pressure of the brake fluid in the wheel cylinder 24, that is, a braking force on the front wheel 3 that is generated by the front-wheel brake mechanism 12 and a braking force on the rear wheel 4 that is generated by the rear-wheel brake mechanism 14 in the brake system 10 for a motorcycle.

The members may collectively be provided in the single base body 51 or may separately be provided in the multiple base bodies 51. The controller 60 may be provided as one unit or may be divided into multiple units. In addition, the controller 60 may be attached to the base body 51 or may be attached to a member other than the base body 51. Furthermore, the controller 60 may partially or entirely be constructed of a microcomputer, a microprocessor unit, or the like, may be constructed of a member in which firmware and the like can be updated, or may be a program module or the like that is executed by a command from a CPU or the like, for example.

In a normal state, that is, in a state where a travel control action, a hill-hold action, an emergency braking action, which will be described below, or the like is not executed, the controller 60 opens the inlet valve 31, closes the outlet valve 32, opens the first valve 35, and closes the second valve 36. When the first brake operation section 11 is operated in such a state, in the front-wheel brake mechanism 12, the piston (not depicted) of the master cylinder 21 is pressed to increase the hydraulic pressure of the brake fluid in the wheel cylinder 24, the brake pad (not depicted) of the brake caliper 23 is pressed against a rotor 3a of the front wheel 3, and the front wheel 3 is thereby braked. When the second brake operation section 13 is operated, in the rear-wheel brake mechanism 14, the piston (not depicted) of the master cylinder 21 is pressed to increase the hydraulic pressure of the brake fluid in the wheel cylinder 24, the brake pad (not depicted) of the brake caliper 23 is pressed against a rotor 4a of the rear wheel 4, and the rear wheel 4 is thereby braked.

As depicted in FIG. 2 and FIG. 3, the brake system 10 for a motorcycle includes a master-cylinder pressure sensor 41, a wheel-cylinder pressure sensor 42, a front-wheel rotational speed sensor 43, a rear-wheel rotational speed sensor 44A, an acceleration sensor 45, and a motive power sensor 46.

The master-cylinder pressure sensor 41 detects hydraulic pressure of the brake fluid in the master cylinder 21. The master-cylinder pressure sensor 41 may detect another physical quantity that can substantially be converted into the hydraulic pressure of the brake fluid in the master cylinder 21. The master-cylinder pressure sensor 41 is provided in each of the front-wheel brake mechanism 12 and the rear-wheel brake mechanism 14.

The wheel-cylinder pressure sensor 42 detects the hydraulic pressure of the brake fluid in the wheel cylinder 24. The wheel-cylinder pressure sensor 42 may detect another physical quantity that can substantially be converted into the hydraulic pressure of the brake fluid in the wheel cylinder 24. The wheel-cylinder pressure sensor 42 is provided in each of the front-wheel brake mechanism 12 and the rear-wheel brake mechanism 14.

The front-wheel rotational speed sensor 43 detects a rotational speed of the front wheel 3. The front-wheel rotational speed sensor 43 may detect another physical quantity that can substantially be converted into the rotational speed of the front wheel 3. The rear-wheel rotational speed sensor 44A detects a rotational speed of the rear wheel 4. The rear-wheel rotational speed sensor 44A may detect another physical quantity that can substantially be converted into the rotational speed of the rear wheel 4. The front-wheel rotational speed sensor 43 and the rear-wheel rotational speed sensor 44A are sensors that cannot detect rotational directions of the wheels (the front wheel 3, the rear wheel 4).

The acceleration sensor 45 detects acceleration that acts on the motorcycle 100. Gravitational acceleration is included in the acceleration that acts on the motorcycle 100. The acceleration sensor 45 may detect another physical quantity that can substantially be converted into the acceleration that acts on the motorcycle 100.

The motive power sensor 46 detects motive power (for example, engine torque, a throttle opening degree, and the like) that is generated in the motorcycle 100. The motive power sensor 46 may detect another physical quantity that can substantially be converted into the motive power that is generated in the motorcycle 100.

The controller 60 includes a brake action control section 61, a vehicle body speed determination section 62, a stopped state determination section 63, a brake operation determination section 64, a slip-down determination section 65A, and a front-wheel braking force determination section 66. In accordance with determination results of the determination sections that respectively use detection results of the sensors, the brake action control section 61 outputs commands that govern actions of the inlet valve 31, the outlet valve 32, the pump 34, the first valve 35, the second valve 36, and the like, so as to execute the travel control action, the hill-hold action, the emergency braking action, which will be described below, and the like.

A description will be made on an action of the brake system for a motorcycle according to the first embodiment.

The controller 60 executes the travel control action, the hill-hold action, the emergency braking action, and the like when a specified condition is satisfied in the normal state, that is, in a state where the inlet valve 31 is opened, the outlet valve 32 is closed, the first valve 35 is opened, and the second valve 36 is closed.

The brake action control section 61 executes the travel control action only when the vehicle body speed determination section 62 determines that a vehicle body speed of the motorcycle 100 exceeds a reference speed. Whether the vehicle body speed of the motorcycle 100 exceeds the reference speed is determined on the basis of the rotational speed of the rear wheel 4 that is detected by the rear-wheel rotational speed sensor 44A, for example.

For example, the travel control action is an action that is executed when the front wheel 3 is locked or is possibly locked and that lowers the hydraulic pressure of the brake fluid in the wheel cylinder 24 of the front-wheel brake mechanism 12, that is, an action that causes the front-wheel brake mechanism 12 to generate the braking force that is not interlocked with only the first brake operation section 11. The brake action control section 61 drives the pump 34 in a state where the inlet valve 31 is closed, the outlet valve 32 is opened, the first valve 35 is opened, and the second valve 36 is closed, so as to lower the hydraulic pressure of the brake fluid in the wheel cylinder 24.

In addition, for example, the travel control action is an action that controls distribution of the braking force generated by each of the front-wheel brake mechanism 12 and the rear-wheel brake mechanism 14, that is, the action that causes the front-wheel brake mechanism 12 to generate the braking force that is not interlocked with only the first brake operation section 11. The brake action control section 61 drives the pump 34 in a state where the inlet valve 31 is opened, the outlet valve 32 is closed, the first valve 35 is closed, and the second valve 36 is opened, so as to control the distribution of the braking force.

The brake action control section 61 permits execution of the hill-hold action only when the stopped state determination section 63 determines that the motorcycle 100 is stopped for more than a reference time. Whether the motorcycle 100 is stopped for more than the reference time is determined on the basis of the rotational speed of the rear wheel 4 that is detected by the rear-wheel rotational speed sensor 44A, for example. The hill-hold action may be started by the user's manual input to a switch or the like or may automatically be started by the brake action control section 61.

For example, the hill-hold action is an action that maintains the braking force even after the user cancels the operation of the first brake operation section 11 or the second brake operation section 13. Once the hill-hold action is started, the brake action control section 61 drives the pump 34 in the state where the inlet valve 31 is opened, the outlet valve 32 is closed, the first valve 35 is closed, and the second valve 36 is opened, so as to maintain the braking force.

Figure 4:
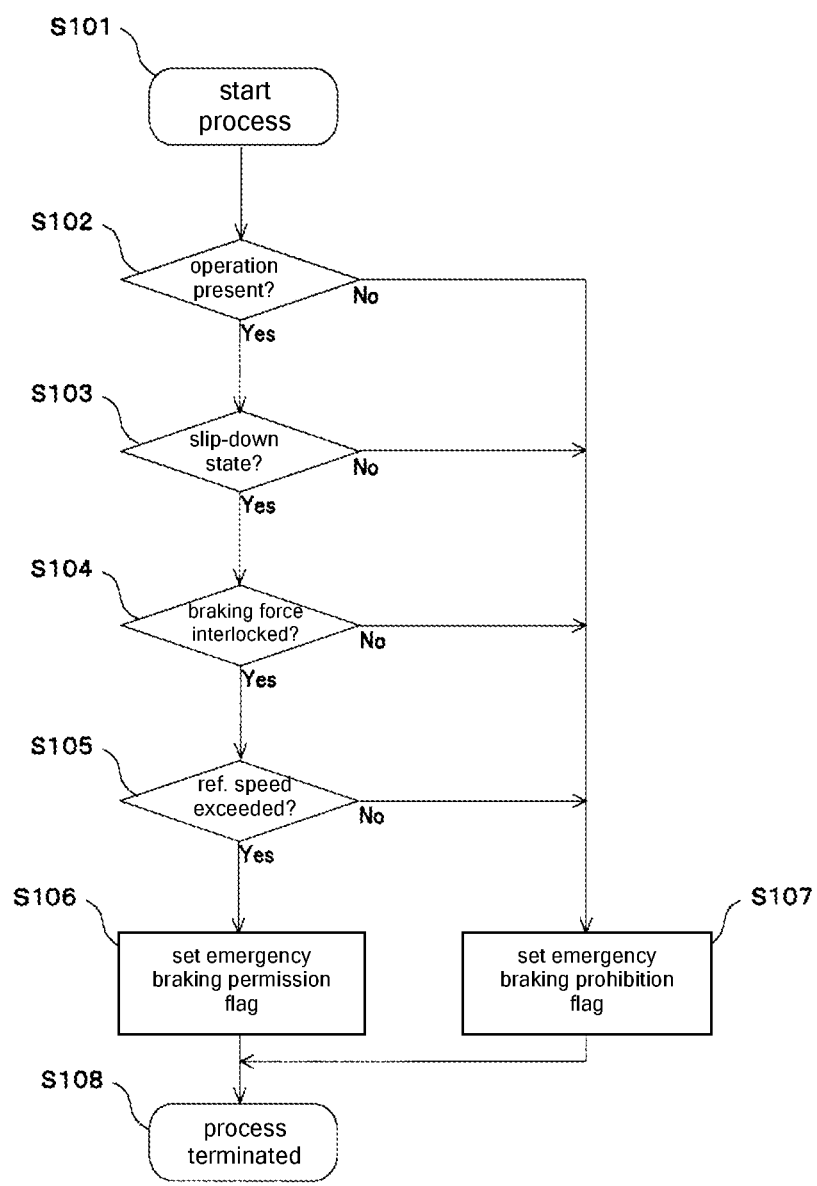
FIG. 4 is a flowchart of a propriety determination process of an emergency braking action that is executed by the brake system for a motorcycle according to the first embodiment of the invention.

FIG. 4 is a flowchart of a propriety determination process of the emergency braking action that is executed by the brake system for a motorcycle according to the first embodiment of the invention.

The brake action control section 61 repeats the proprietary determination process of the emergency braking action, which is depicted in FIG. 4, at specified time intervals when the motorcycle 100 travels on an uphill road surface in a state where neither the travel control action nor the hill-hold action is executed. That is, the emergency braking action is not executed in a state where the front-wheel brake mechanism 12 generates the braking force that is not interlocked with only the first brake operation section 11. In addition, the emergency braking action is not executed in a state where the vehicle body speed determination section 62 determines that the vehicle body speed of the motorcycle 100 exceeds the reference speed that is used to limit the execution of the travel control action. Furthermore, the emergency braking action is executed at a time point that is after the motorcycle 100 is stopped and before a lapse of the reference time that is used to limit permission of the execution of the hill-hold action.

In step S101, the brake action control section 61 starts the proprietary determination process of the emergency braking action.

In step S102, the brake operation determination section 64 determines presence or absence of a user's operation of the first brake operation section 11. The presence or absence of the user's operation of the first brake operation section 11 is determined, for example, on the basis of the detection result of the master-cylinder pressure sensor 41 that detects the hydraulic pressure of the brake fluid in the master cylinder 21 of the front-wheel brake mechanism 12. If Yes (if the operation is present), the process proceeds to step S103. If No (if the operation is absent), the process proceeds to step S107.

In step S103, the slip-down determination section 65A determines whether the motorcycle 100 is in a slip-down state where the motorcycle 100 travels backward while the front wheel 3 is braked. As the slip-down state, for example, a state where the rear wheel 4 that is not braked rolls regardless of a fact that the front wheel 3 is braked by the front-wheel brake mechanism 12 and the rotational speed thereof is zero and the motive power that is generated in the motorcycle 100 is zero regardless of a fact that a degree of an upward slope of the road surface is at least equal to a reference value (is steep) may be determined. Own weight of the motorcycle 100, a riding state of the user, weight of the user, and the like may be taken into consideration for the determination of the slip-down state.

Whether the motorcycle 100 is in the slip-down state where the motorcycle 100 travels backward while the front wheel 3 is braked is determined, for example, on the basis of the detection result of the front-wheel rotational speed sensor 43 that detects the rotational speed of the front wheel 3, the detection result of the rear-wheel rotational speed sensor 44A that detects the rotational speed of the rear wheel 4, the detection result of the acceleration sensor 45 that detects the acceleration acting on the motorcycle 100, and the detection result of the motive power sensor 46 that detects the motive power (for example, the engine torque, the throttle opening degree, and the like) that is generated in the motorcycle 100. The degree of the upward slope of the road surface is estimated from the detection result of the acceleration sensor 45. If Yes (if the motorcycle 100 is in the slip-down state), the process proceeds to step S104. If No (if the motorcycle 100 is not in the slip-down state), the process proceeds to step S107.

In step S104, the front-wheel braking force determination section 66 determines whether the braking force on the front wheel 3, which is generated by the front-wheel brake mechanism 12, is only interlocked with the first brake operation section 11. Whether the braking force on the front wheel 3, which is generated by the front-wheel brake mechanism 12, is only interlocked with the first brake operation section 11 is determined, for example, on the basis of a comparison between the detection result of the master-cylinder pressure sensor 41, which detects the hydraulic pressure of the brake fluid in the master cylinder 21 of the front-wheel brake mechanism 12, and the detection result of the wheel-cylinder pressure sensor 42, which detects the hydraulic pressure of the brake fluid in the wheel cylinder 24 of the front-wheel brake mechanism 12. If Yes (if the braking force on the front wheel 3 is only interlocked with the first brake operation section 11), the process proceeds to step S105. If No (if the braking force on the front wheel 3 is not interlocked with only the first brake operation section 11), the process proceeds to step S107.

In step S105, the vehicle body speed determination section 62 determines whether the vehicle body speed of the motorcycle 100 does not exceed the reference speed that is used to limit the execution of the travel control action. Whether the vehicle body speed of the motorcycle 100 does not exceed the reference speed that is used to limit the execution of the travel control action is determined on the basis of the detection result of the rear-wheel rotational speed sensor 44A that detects the rotational speed of the rear wheel 4, for example. If Yes (if the vehicle body speed of the motorcycle 100 does not exceed the reference speed), the process proceeds to step S106. If No (if the vehicle body speed of the motorcycle 100 exceeds the reference speed), the process proceeds to step S107.

In step S106, the brake action control section 61 sets a flag indicating permission of execution of the emergency braking action. On the other hand, in step S107, the brake action control section 61 sets a flag indicating prohibition of the execution of the emergency braking action.

In step S108, the proprietary determination process of the emergency braking action is terminated.

If the emergency braking action is permitted in step S107, the brake action control section 61 computes a target value of the hydraulic pressure of the brake fluid in the wheel cylinder 24 of the rear-wheel brake mechanism 14, and causes the rear-wheel brake mechanism 14 to generate the braking force that brakes the rear wheel 4 while referring to the target value. For example, in a state where the inlet valve 31 is opened, the outlet valve 32 is closed, the first valve 35 is opened, and the second valve 36 is closed in the front-wheel brake mechanism 12 and the inlet valve 31 is opened, the outlet valve 32 is closed, the first valve 35 is closed, and the second valve 36 is opened in the rear-wheel brake mechanism 14, the brake action control section 61 drives the pumps 34 of the front-wheel brake mechanism 12 and the rear-wheel brake mechanism 14 and thereby causes the rear-wheel brake mechanism 14 to generate the braking force that brakes the rear wheel 4. The target value of the hydraulic pressure of the brake fluid in the wheel cylinder 24 is reflected to a rotational frequency of the pump 34 and the like.

The degree of the slope of the road surface and vehicle specifications (known information) of the motorcycle 100 are taken into consideration when the target value of the hydraulic pressure of the brake fluid in the wheel cylinder 24 is computed. That is, the brake action control section 61 causes the rear-wheel brake mechanism 14 to generate the braking force that corresponds to the degree of the upward slope of the road surface in the emergency braking action. The degree of the upward slope of the road surface can be estimated by using the detection result of the acceleration sensor 45 that detects the acceleration acting on the motorcycle 100. The degree of the slope of the road surface may be computed from the detection result of the acceleration sensor 45, and the target value of the hydraulic pressure of the brake fluid in the wheel cylinder 24 may be computed by using the computation result. Alternatively, the target value of the hydraulic pressure of the brake fluid in the wheel cylinder 24 may directly be computed from the detection result of the acceleration sensor 45.

A description will be made on effects of the brake system for a motorcycle according to the first embodiment.

In the brake system 10 for a motorcycle, in the cases where it is determined that the user's operation of the first brake operation section 11 is present and it is determined that the motorcycle 100 is in the slip-down state where the motorcycle 100 travels backward while the front wheel 3 is braked when the road surface is the upward slope, the emergency braking action is executed to cause the rear-wheel brake mechanism 14 to generate the braking force that brakes the rear wheel 4. Accordingly, even in the case where the motorcycle 100 travels backward regardless of the fact that the front wheel 3 is braked by the user's operation of the first brake operation section 11 when the road surface is the steep upward slope, behavior of the vehicle body can be stabilized without depending on a user's operation of the second brake operation section 13. Thus, behavior stability of the motorcycle 100 at a time when the road surface is the steep upward slope is improved.

In addition, for example, even in the case where the brake action control section 61 executes the travel control action only when the vehicle body speed of the motorcycle 100 exceeds the reference speed, the rear-wheel brake mechanism 14 generates the braking force that brakes the rear wheel 4 in a state where the vehicle body speed of the motorcycle 100 does not exceed the reference speed, and the behavior stability of the vehicle body can thereby be secured. Thus, realization of the improved stability of the braking force control can be improved by adopting the travel control action that is executed only when the vehicle body speed of the motorcycle 100 exceeds the reference speed.

Furthermore, for example, even in the case where the brake action control section 61 permits the execution of the hill-hold action only when the motorcycle 100 is stopped for more than the reference time, the rear-wheel brake mechanism 14 generates the braking force that brakes the rear wheel 4 in a state where the motorcycle 100 is not stopped for more than the reference time, and the behavior stability of the vehicle body can thereby be secured. Thus, realization of the improved user safety can be improved by adopting the hill-hold action that is executed only when the motorcycle 100 is stopped for more than the reference time.

Preferably, in the brake system 10 for a motorcycle, the emergency braking action is executed only when it is determined that the braking force on the front wheel 3 generated by the front-wheel brake mechanism 12 is only interlocked with the first brake operation section 11. Accordingly, in the case where the brake action control section 61 executes the travel control action, the execution of the emergency braking action during the execution of the travel control action is reliably suppressed. Thus, the stability of the braking force control is improved.

Preferably, in the brake system 10 for a motorcycle, the emergency braking action is executed only when it is determined that the vehicle body speed of the motorcycle 100 does not exceed the reference speed that is used to limit the execution of the travel control action. Accordingly, in the case where the brake action control section 61 executes the travel control action only when the vehicle body speed of the motorcycle 100 exceeds the reference speed, the execution of the emergency braking action during the execution of the travel control action is reliably suppressed. Thus, the stability of the braking force control is improved.

Preferably, in the brake system 10 for a motorcycle, the brake action control section 61 causes the rear-wheel brake mechanism 14 to generate the braking force that corresponds to the degree of the upward slope of the road surface in the emergency braking action. Accordingly, the larger braking force than necessary is suppressed from being generated on the motorcycle 100 in the stopped state by the emergency braking action. Thus, during transition to the start, necessity of increasing the throttle opening degree in accordance with the large braking force is suppressed.

For example, the brake action control section 61 causes the rear-wheel brake mechanism 14 to generate the braking force that corresponds to the degree of the upward slope of the road surface in the emergency brake action. Thus, even in the case where the brake action control section 61 executes the hill-hold action in which the braking force that corresponds to the degree of the slope of the road surface is generated, it is possible to suppress generation of a difference in the required throttle opening degree for the start between a case of transition from the hill-hold action to the start and a case of transition from the emergency brake action to the start. Thus, operation feeling of the user is improved.

Preferably, in the brake system 10 for a motorcycle, whether the motorcycle 100 is in the slip-down state where the motorcycle 100 travels backward while the front wheel 3 is braked is determined on the basis of the rotational speed of the front wheel 3, the rotational speed of the rear wheel 4, the acceleration that acts on the motorcycle 100, and the motive power (for example, the engine torque, the throttle opening degree, and the like) that is generated in the motorcycle 100. Accordingly, whether the motorcycle 100 is in the slip-down state where the motorcycle 100 travels backward while the front wheel 3 is braked can be determined by using the sensors (the front-wheel rotational speed sensor 43 and the rear-wheel rotational speed sensor 44A) that cannot detect the rotational direction. Thus, versatility of the brake system 10 for a motorcycle is improved.

A description will be made on a brake system for a motorcycle according to a second embodiment.

Note that the overlapping or similar description to that on the brake system for a motorcycle according to the first embodiment will appropriately be simplified or omitted.

A description will be made on a configuration of the brake system for a motorcycle according to the second embodiment.

Figure 5:
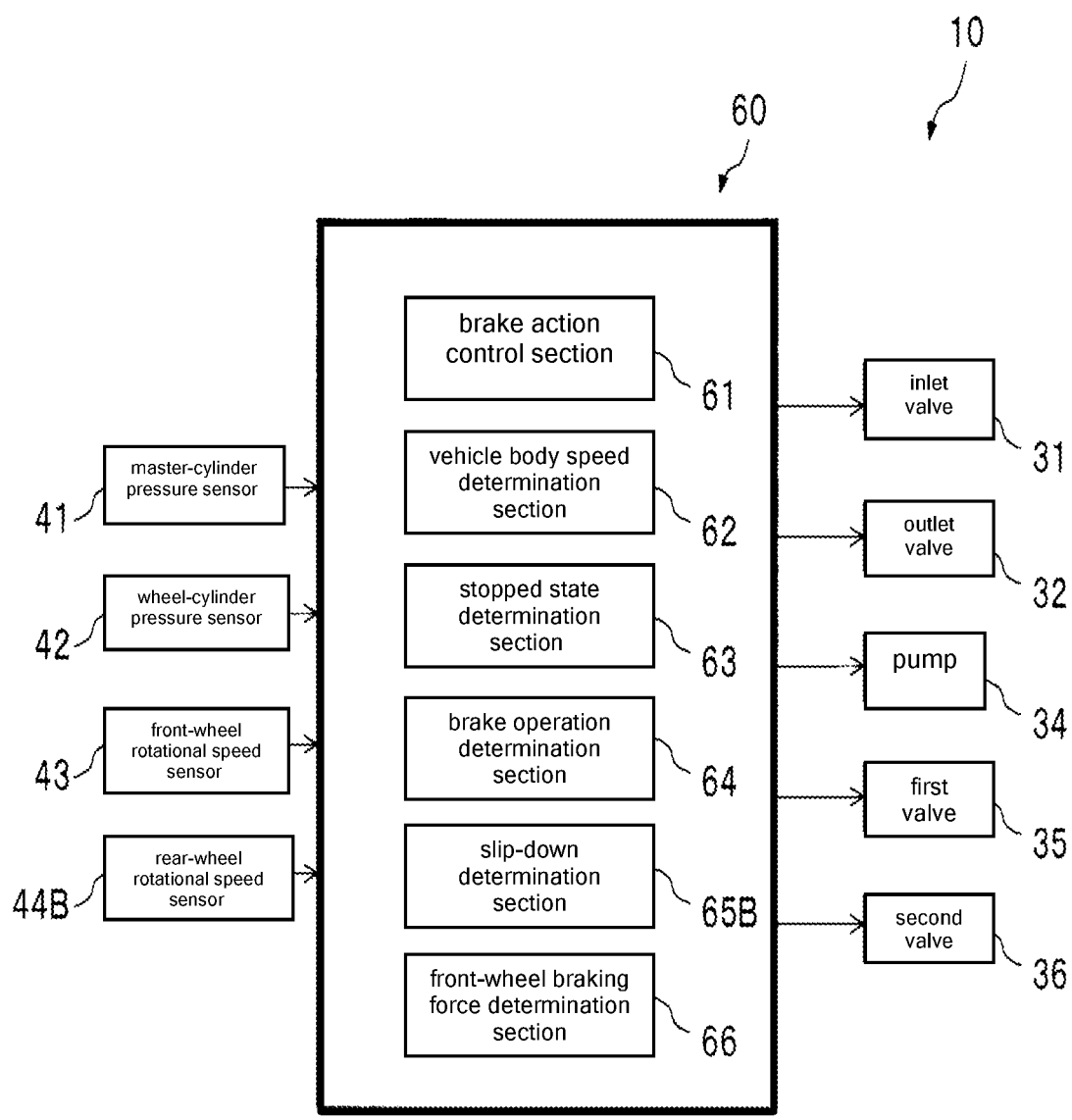
FIG. 5 is a view of a system configuration of a main section of a brake system for a motorcycle according to a second embodiment of the invention.

FIG. 5 is a view of a system configuration of a main section of the brake system for a motorcycle according to the second embodiment of the invention.

As depicted in FIG. 5, the brake system 10 for a motorcycle includes the master-cylinder pressure sensor 41, the wheel-cylinder pressure sensor 42, the front-wheel rotational speed sensor 43, and a rear-wheel rotational speed sensor 44B.

The front-wheel rotational speed sensor 43 detects the rotational speed of the front wheel 3. The front-wheel rotational speed sensor 43 may detect the rotational speed and the rotational direction of the front wheel 3. The rear-wheel rotational speed sensor 44B detects the rotational speed and the rotational direction of the rear wheel 4. The rear-wheel rotational speed sensor 44B may detect another physical quantity that can substantially be converted into the rotational direction of the rear wheel 4.

The controller 60 includes the brake action control section 61, the vehicle body speed determination section 62, the stopped state determination section 63, the brake operation determination section 64, a slip-down determination section 65B, and the front-wheel braking force determination section 66.

A description will be made on an action of the brake system for a motorcycle according to the second embodiment.

Figure 6:
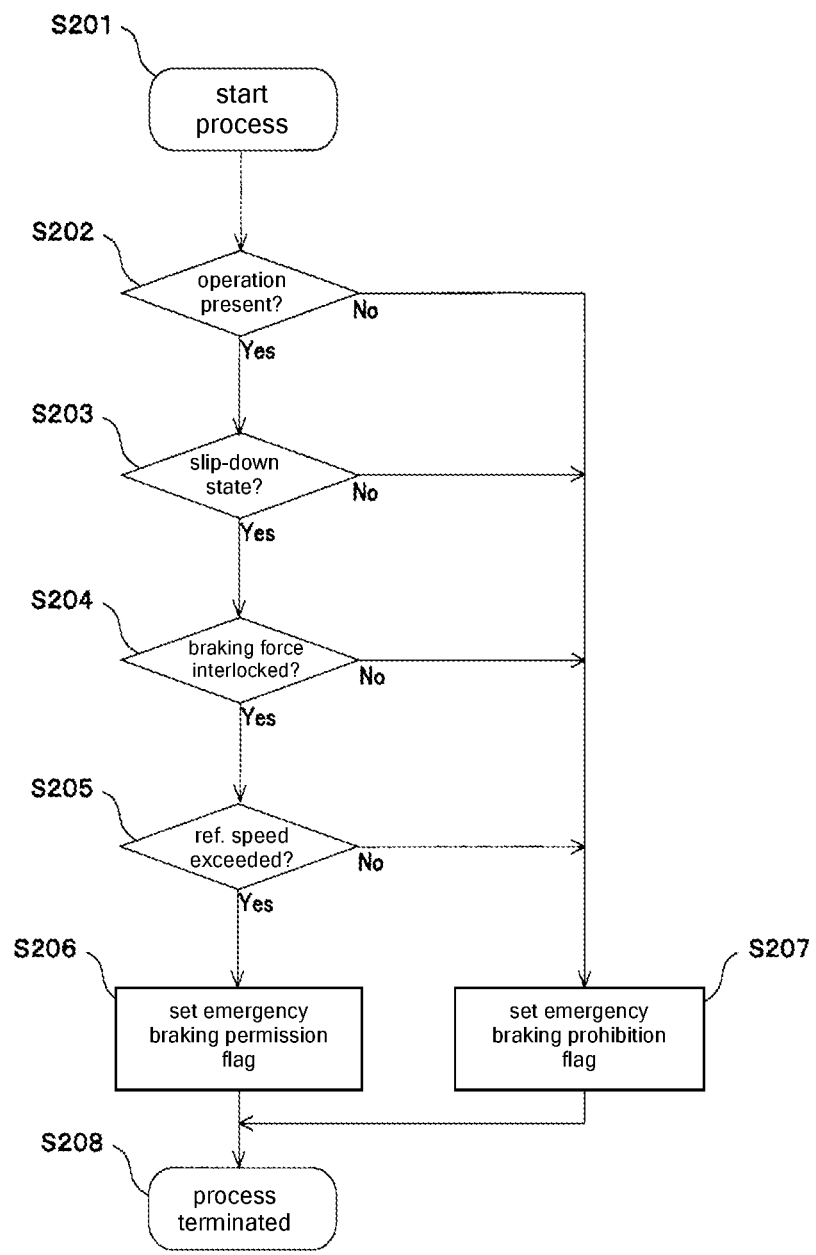
FIG. 6 is a flowchart of a propriety determination process of an emergency braking action that is executed by the brake system for a motorcycle according to the second embodiment of the invention.

FIG. 6 is a flowchart of a propriety determination process of an emergency braking action that is executed by the brake system for a motorcycle according to the second embodiment of the invention. Step S201, step S202, and steps S204 to S208 in FIG. 6 are the same as step S101, step S102, and steps S104 to S108 in FIG. 4.

In step S203, the slip-down determination section 65B determines whether the motorcycle 100 is in the slip-down state where the motorcycle 100 travels backward while the front wheel 3 is braked. For example, whether the motorcycle 100 is in the slip-down state where the motorcycle 100 travels backward while the front wheel 3 is braked is determined, for example, on the basis of the detection result of the front-wheel rotational speed sensor 43 that detects the rotational speed of the front wheel 3 and a detection result of the rear-wheel rotational speed sensor 44B that detects the rotational speed and the rotational direction of the rear wheel 4. If Yes (if the motorcycle 100 is in the slip-down state), the process proceeds to step S204. If No (if the motorcycle 100 is not in the slip-down state), the process proceeds to step S207.

A description will be made on effects of the brake system for a motorcycle according to the second embodiment.

Preferably, in the brake system 10 for a motorcycle, whether the motorcycle 100 is in the slip-down state where the motorcycle 100 travels backward while the front wheel 3 is braked is determined on the basis of the rotational speed of the front wheel 3 as well as the rotational speed and the rotational direction of the rear wheel 4. Accordingly, whether the motorcycle 100 is in the slip-down state where the motorcycle 100 travels backward while the front wheel 3 is braked can be determined without using the acceleration sensor 45 that detects the acceleration acting on the motorcycle 100 and the motive power sensor 46 that detects the motive power (for example, the engine torque, the throttle opening degree, and the like) that is generated in the motorcycle 100. Thus, the versatility of the brake system 10 for a motorcycle is improved.

The description has been made so far on the first embodiment and the second embodiment. However, the invention is not limited by the description of each of the embodiments. For example, all or parts of the embodiments may be combined, or only a part of each of the embodiments may be implemented. In addition, orders of the steps may be switched, for example.

The invention claimed is:

1. A controller of a brake system for a motorcycle, the brake system for a motorcycle comprising:
   a first brake operation section that is provided on a handlebar of the motorcycle;
   a front-wheel brake mechanism that brakes a front wheel of the motorcycle in an interlocking manner with at least the first brake operation section;
   a second brake operation section that is provided on a trunk of the motorcycle; and
   a rear-wheel brake mechanism that brakes a rear wheel of the motorcycle in an interlocking manner with at least the second brake operation section,
   the controller comprising:
   a brake action control section that at least governs an action of the rear wheel brake mechanism, a brake operation determination section that determines presence or absence of a user's operation of the first brake operation section, and a slip-down determination section that determines whether the motorcycle is in a slip-down state where the motorcycle travels backward while the front wheel is braked, wherein in the cases where the brake operation determination section determines that the user's operation of the first brake operation section is present and the slip-down determination section determines that the motorcycle is in the slip-down state when a road surface is an upward slope, the brake action control section executes an emergency braking action that causes the rear-wheel brake mechanism to generate a braking force that brakes the rear wheel.

2. The controller of the brake system for a motorcycle according to claim 1, wherein the front-wheel brake mechanism includes a master cylinder, and the brake operation determination section determines the presence or absence of the user's operation of the first brake operation section on the basis of hydraulic pressure of a brake fluid in the master cylinder.

3. The controller of the brake system for a motorcycle according to claim 1, wherein the slip-down determination section determines whether the motorcycle is in the slip-down state on the basis of rotational speeds of the front wheel and the rear wheel of the motorcycle, a degree of the upward slope of the road surface, and motive power of the motorcycle.

4. The controller of the brake system for a motorcycle according to claim 1, wherein the slip-down determination section determines whether the motorcycle is in the slip-down state on the basis of rotational speeds of the front wheel and the rear wheel of the motorcycle and a rotational direction of the rear wheel of the motorcycle.

5. The controller of the brake system for a motorcycle according to claim 1, the controller further comprising:

a front-wheel braking force determination section that determines a braking force on the front wheel generated by the front-wheel brake mechanism, wherein the brake action control section executes a travel control action of the motorcycle that causes the front-wheel brake mechanism to generate the braking force that is not interlocked with only the first brake operation section, and the emergency braking action that is executed at a time when the road surface is the uphill slope is executed only when the front-wheel braking force determination section determines that the braking force on the front wheel generated by the front-wheel brake mechanism is only interlocked with the first brake operation section.

6. The controller of the brake system for a motorcycle according to claim 5, wherein the front-wheel brake mechanism includes a wheel cylinder, and the front-wheel braking force determination section determines the braking force on the front wheel that is generated by the front-wheel brake mechanism on the basis of hydraulic pressure of a brake fluid in the wheel cylinder.

7. The controller of the brake system for a motorcycle according to claim 1, the controller further comprising:

a vehicle body speed determination section that determines a vehicle body speed of the motorcycle, wherein the brake action control section executes a travel control action of the motorcycle only when the vehicle body speed determination section determines that the vehicle body speed exceeds a reference speed, and the emergency braking action that is executed at the time when the road surface is the upward slope is executed only when the vehicle body speed determination section determines that the vehicle body speed does not exceed the reference speed.

8. The controller of the brake system for a motorcycle according to claim 7, wherein the vehicle body speed determination section determines the vehicle body speed on the basis of the rotational speed of the rear wheel.

9. The controller of the brake system for a motorcycle according to claim 1, the controller further comprising:

a stopped state determination section that determines whether the motorcycle is stopped for more than a reference time, wherein the brake action control section permits execution of a hill-hold action of the motorcycle only when the stopped state determination section determines that the motorcycle is stopped for more than the reference time, and the emergency braking action that is executed at the time when the road surface is the upward slope is executed at a time point that is after the motorcycle is stopped and before a lapse of the reference time.

10. The controller of the brake system for a motorcycle according to claim 9, wherein the stopped state determination section determines whether the motorcycle is stopped for more than the reference time on the basis of the rotational speed of the rear wheel.

11. The controller of the brake system for a motorcycle according to claim 1, wherein the brake action control section causes the rear-wheel brake mechanism to generate the braking force corresponding to a degree of the upward slope of the road surface in the emergency braking action.

12. The controller of the brake system for a motorcycle according to claim 1, wherein the first brake operation section is a brake lever, and the second brake operation section is a brake pedal.

13. A brake system for a motorcycle comprising:

the controller of the brake system for a motorcycle according to claim 1.

14. A control method of a brake system for a motorcycle, the brake system for a motorcycle including:

a first brake operation section that is provided on a handlebar of a motorcycle;

a front-wheel brake mechanism that brakes a front wheel of the motorcycle in an interlocking manner with at least the first brake operation section;

a second brake operation section that is provided on a trunk of the motorcycle; and a rear-wheel brake mechanism that brakes a rear wheel of the motorcycle in an interlocking manner with at least the second brake operation section, the control method comprising:

a brake action control step of at least governing an action of the rear wheel brake mechanism, the control method further comprising:

a brake operation determination step of determining presence or absence of a user's operation of the first brake operation section; and a slip-down determination step of determining whether the motorcycle is in a slip-down state where the motorcycle travels backward while the front wheel is braked, wherein in the brake action control step, in the cases where it is determined in the brake operation determination step that the user's operation of the first brake operation section is present and it is determined in the slip-down determination step that the motorcycle is in the slip-down state when a road surface is an upward slope, an emergency control action that causes the rear-wheel brake mechanism to generate a braking force that brakes the rear wheel is executed.

* * * * *